United States Patent [19]

Tompkins et al.

[11] Patent Number: 5,062,782
[45] Date of Patent: Nov. 5, 1991

[54] COEXTRUSION APPARATUS FOR VARYING THE INNER AND/OR OUTER PROFILE OF A TUBULAR EXTRUDATE

[75] Inventors: Dale A. Tompkins, Akron; Richard W. Sicka, Brecksville, both of Ohio

[73] Assignee: Bridgestone/Firestone, Inc., Akron, Ohio

[21] Appl. No.: 557,191

[22] Filed: Jul. 24, 1990

[51] Int. Cl.$^5$ .................... B29C 47/02; B29C 47/06; B29C 47/16

[52] U.S. Cl. .................... 425/113; 264/167; 264/172; 264/515; 425/132; 425/133.1; 425/381; 425/465; 425/466

[58] Field of Search .................... 425/113, 114, 131.1, 425/133.1, 381, 462, 465, 466, 467, 132, 380; 264/167, 173, 541, 514, 515, 172

[56] References Cited

U.S. PATENT DOCUMENTS

| | | | |
|---|---|---|---|
| 2,501,690 | 3/1950 | Prendergast | 425/133.1 |
| 2,736,921 | 3/1956 | Mulbarger | 425/465 |
| 3,078,507 | 2/1963 | Park | 425/133.1 |
| 3,134,832 | 5/1964 | Smith | 264/167 |
| 3,209,404 | 10/1965 | Hagen | 425/466 |
| 3,281,896 | 11/1966 | Meyer et al. | 425/466 |
| 3,453,690 | 7/1969 | Mayner | 425/466 |
| 3,587,281 | 6/1971 | Lemelson | 72/265 |
| 3,840,311 | 10/1974 | Wight | 425/133 |
| 3,940,221 | 2/1976 | Nissel | 425/141 |
| 3,944,641 | 3/1976 | Lemelson | 264/70 |
| 4,029,458 | 6/1977 | Kim et al. | 425/135 |
| 4,038,017 | 7/1977 | Langecker | 425/466 |
| 4,047,868 | 9/1977 | Kudo et al. | 425/133.1 |
| 4,149,839 | 4/1979 | Iwawaki et al. | 425/133.1 |
| 4,171,195 | 10/1979 | Klein et al. | 425/141 |
| 4,249,875 | 2/1981 | Hart et al. | 425/133.1 |
| 4,279,857 | 7/1981 | Feuerherm | 264/541 |
| 4,422,839 | 12/1983 | Przytulla et al. | 425/465 |
| 4,432,718 | 2/1984 | Wurzer | 425/466 |
| 4,465,449 | 8/1984 | Hornbeck | 425/131.1 |
| 4,472,129 | 9/1984 | Siard | 425/381 |
| 4,507,071 | 3/1985 | Hahn et al. | 425/133.1 |
| 4,578,024 | 3/1986 | Sicka et al. | 425/114 |
| 4,578,025 | 3/1986 | Ando et asl. | 425/133.1 |
| 4,657,718 | 4/1987 | Sicka et al. | 264/146 |
| 4,776,909 | 10/1988 | Bohm et al. | 156/117 |
| 4,946,364 | 8/1990 | Wagner et al. | 425/72.1 |

FOREIGN PATENT DOCUMENTS

1370281 10/1974 United Kingdom ................ 425/132
2050933 1/1981 United Kingdom .

Primary Examiner—Jay H. Woo
Assistant Examiner—Khanh P. Nguyen
Attorney, Agent, or Firm—Ernst H. Ruf

[57] ABSTRACT

Coextrusion apparatus for varying the inner profile of a generally tubular extrudate formed by a first stream of elastomeric material by an axially movable inner die ring which varies the size of an orifice and consequently the flow of a second stream of elastomeric material which is deposited on the inner surface of the tubular extrudate. A compensating ring is axially slidably mounted within the inner die ring and moves generally in an opposite direction to the movement of the die ring to compensate for pressure changes within the second stream of material caused by varying the size of the orifice, to provide an accurately controlled initiation and termination of the material. Pistons are formed integrally on the inner die ring and compensating ring and are located within annular fluid pressure chambers whereby the flow of fluid into the chambers will coordinate the movement of the die ring and compensating ring. A reinforcing guide directs the plurality of fiber reinforcing elements into the tubular extrudate prior to depositing the variable stream of elastomeric material on the inner surface of the extrudate. In another embodiment, a generally constant outer layer of a different elastomeric material may be applied to the outer surface of the tubular extrudate simultaneously with the varying of the inner profile thereof.

11 Claims, 9 Drawing Sheets

COEXTRUSION APPARATUS FOR VARYING THE INNER AND/OR OUTER PROFILE OF A TUBULAR EXTRUDATE

BACKGROUND OF THE INVENTION

1. Technical Field

The field of art to which this invention pertains is that of a coextrusion apparatus, particularly for use in manufacturing annular seamless components of elastomeric materials such as used in the production of pneumatic tires, specifically body plies for radial tires. More particularly the invention relates to such a coextrusion apparatus in which the inner and/or outer profile of the tubular extrudate is varied by varying the amount of elastomeric material applied to the inner or outer surface of the extrudate.

2. Background Information

Tubular components or articles such as pneumatic tire body plies, have previously generally been built by utilizing woven fabric and calendering the same with rubber stock which, when cut to size, entails wrapping the sheet component around a tire building drum and overlapping the ends of the sheet to produce an annulus with a generally axially extending seam. In order to avoid this lapped or seamed construction, extrusion has been employed in the prior art whereby a tubular extrudate is produced containing reinforcement cords disposed therein.

Many of the problems with such lapped or seamed construction have been resolved by our previous invention of a coextrusion apparatus and method disclosed in U.S. Pat. Nos. 4,578,024 and 4,657,718, which are incorporated herein by reference in the interest of full disclosure. These earlier inventions provide a solution to the noted prior art problems by producing a generally tubular elastomeric ply or extrudate made up of first and second concentric tubular streams of elastomeric material having interposed adjacent their common interface, a closely and uniformly spaced array of parallel reinforcing elements. In the building of a tire, the carcass or first stage body consists of six elements namely, a body ply which is the reinforcing cord and skim, two sidewall bands or annuli, two body ply insert annuli and an inner liner. Heretofore assembly or placement of these six bands on a tire building drum required six separate manually performed steps wherein the individual strips were placed on the tire building drum.

These various individual strips of rubber usually were formed of different elastomeric compositions in order to achieve different results when assembled into the final tire. The inner liner is formed of a highly air impervious material and is applied to the body ply to provide the barrier for retaining the air within a tubeless pneumatic tire. The particular compound of the inner liner provides such impermeability characteristics. The present invention described below pertains particularly to the application of an inner liner on the tubular body ply component of a vehicle tire in forming a first stage tire wherein the body ply is extruded as a tubular extrudate and the inner liner applied at distinct locations on the inner surface of the tubular extrudate, in addition to applying an outer layer on the tubular extrudate, preferably of a different elastomeric material than the tubular extrudate.

The most pertinent prior art with respect to applying a layer of material on the inner surface of an extrudate are shown in the following patents.

U.S. Pat. No. 3,078,507 discloses an extruding device for making hollow cylinders and comprises an extrusion head having a central bore and an annular extrusion chamber. A control sleeve slides axially within a guide sleeve. This member can serve as a cutoff member or can be used to control the thickness of the extrudate flow. A control sleeve also is provided having an irregular beveled lower end so that thicker walls can be formed at opposite points of the extrusion.

U.S. Pat. No. 3,209,404 discloses a screw extruder having a barrel and a screw rotatable within the barrel. A die holder includes a die insert in a tubular mandrel. A rod is axially movable within a pin and a sleeve can be set to any desired position by controlling the pressure of the volume of fluid admitted to a cylinder in order to control the thickness of the wall of the tube being extruded. A valve actuating cam can be shaped to provide a desired cyclical fluid flow to the cylinder to obtain a predetermined variation in the wall thickness of the blank extruded from an orifice.

U.S. Pat. No. 3,281,896 discloses a parison extrusion die assembly having a movable mandrel, positioned within a cylindrical passageway in a die head. The longitudinal position of the mandrel can be adjusted so that the thickness of the tubular extrudate can be regulated by changes in the exit orifice.

U.S. Pat. No. 3,587,281 discloses an extrusion die having a mandrel head which is axially movable so as to vary the interior wall thickness of the tubular extrusion and completely stop the flow of extrusion material to terminate the extrusion. The extrusion apparatus includes a chamber, a die, and an axially movable mandrel with a tapering head defined by a lip. If the mandrel is driven in a predetermined direction, the extrusion material will not flow and the extrusion can be effectively cut to a predetermined length.

U.S. Pat. No. 3,944,641 discloses a device for altering the contour of the interior surface of a pipe wall. The apparatus comprises a rotatable blade or disc at the end of an extrusion mandrel. A lip formation is provided at the exterior surface of the mandrel outer end so as to form a plurality of grooves in the wall of the extrusion as the mandrel rotates. A linear actuator rotates the mandrel in the extrusion chamber.

U.S. Pat. No. 4,029,458 discloses an extrusion die having a linearly movable mandrel with a piston integrally formed along its intermediate portion which operates within a chamber. The thickness of the extrudate coming from a die is determined by the position of an annular edge of the mandrel with respect to the annular edge of a die head. When the control means alters the position of the piston the annular edge will be varied with respect to the annular edge of the die head to vary the shape of the parison being extruded.

U.S. Pat. No. 4,038,017 discloses an extrusion head, a die core, a sleeve and a movable annular piston. The piston is actuated by a hydraulic cylinder which raises and lowers a die core and adjusts the size of an annular opening which would alter the thickness of a laminate being produced by the extrusion head.

U.S. Pat. No. 4,047,868 discloses a parison extrusion molding machine comprising a special die head and a main extruder attached to the die head. The resin for the innermost layer of a composite is fed into an inlet from the main extruder. The thermoplastic resin flows through a passage which is defined by a sleeve wall and housing wall. The thickness of the laminate flow of the molten resin is controlled by adjusting the space between the inner sleeve of a pressure ring and the outer ring of a sleeve by moving an adjusting screw. Furthermore, the thickness of the parisons can be changed by varying the space between a core pin and die which results from vertical movement of a holder, together with the core pin.

U.S. Pat. No. 4,171,195 discloses a crosshead die in which the volume of the manifold can be varied so as to vary the relative wall thickness about the material flowing through the die. The apparatus includes a threaded collar, a forwardly extending sleeve and a frustroconical front portion which defines an orifice between the sleeve and rod. The wall thickness of material emerging from the orifice can be adjusted by axial movement of the rod and extension which changes the dimensions of the orifice.

U.S. Pat. No. 4,422,839 discloses an annular exit die for an extrusion head in which a die casing ring comprises generally concentric shells. The shells are nested within each other and are rigidly fastened to the housing of an extrusion head. A step portion is provided on one of the shells and the wall thickness of the extrudate can be varied at predetermined points as a result of the axial height adjustment of a die core. A lower edge of the die core forms the inner boundary of the die gap and displacement of the core downwardly in an axial fashion alters the wall thickness of the hollow extrudate.

U.S Pat. No. 4,465,449 discloses an extrusion feed block apparatus which comprises an extrusion die and a cylindrical torpedo element disposed within a central bore. Radial movement of the torpedo element by a spider body alters the dimensions of a passageway and, thus, the thickness of the inner layer of a pipe. This movement is accomplished by threading bolts inwardly and outwardly. A bushing also is radially adjustable for adjustment of the passageway. This device serves to control the thickness uniformity of an inner pipe layer and the overall uniformity of the laminate as it traverses the passageway.

U.S. Pat. No. 4,507,071 discloses an apparatus for forming a multiple layer laminated pipe. A die body is provided having a transitional body portion and a discharge sleeve at one end. The discharge sleeve is concentrically positioned within a sleeve adjustment body and includes an annular ridge engaged by an annular lip of a sleeve adjustment body. The sleeve is capable of slight radial movement. A plug can be used to reduce the flow of the central passage, and additional adjustments in the thickness of the outer layer and inner layer can be performed by rotating adjusting bolts so as to radially reposition the sleeve to a desired location.

U.S. Pat. No. 4,578,025 discloses a die assembly for extruding multi-layer parisons which includes a plurality of control rings for determining the thickness of each layer. The apparatus includes a core pin, a mandrel, and a plurality of control rings. Selection of the curvature and height of the control rings can be selected to change the thickness of the resin material passing through gaps formed therebetween. The overall thickness the combined resin laminate can be controlled by moving the core pin and die with a shaft prior to the resin exiting from the nozzle.

The most pertinent prior art with respect to applying and varying the outer profile of a tubular extrudate are shown in the following U.S. patents.

U.S. Pat. No. 3,134,832 discloses a method for extruding articles which comprises an extrusion die having a body and a cylindrical exterior sleeve. A central circular hole is provided and an elastomeric constrictive annulus which defines the extrusion aperture is positioned directly behind a flange. The annulus is held against the interior surface of the flange by a ring. As a gear is turned a follower is screwed into the exterior sleeve, pressing against the ring and annulus so that the annulus can expand inwardly under the compressive force in order to uniformly reduce the size of the hole in the annulus, i.e., reduce the size of the extrusion aperture.

U.S. Pat. No. 3,840,311 discloses an extrusion nozzle for manufacturing a plurality of frozen food type articles. This patent discloses an extrusion chamber having an inlet supply and terminating in an outlet orifice. A flexible wall formed from neoprene rubber can be attached to the casing wall adjacent the outlet in a conventional fashion. Five air cylinders are mounted on a frame which serve to indent a flexible wall so as to vary the shape of the wall and alter the dimensions of the exit orifice.

U.S. Pat. No. 3,940,221 discloses a die with a controllable lower lip opening. A metal die block is provided with a passageway for receiving flowable material which has a lower lip portion and an upper lip. The opening between the lips can be adjusted by moving an elongated metal rod having a head. The metal rod extends through a heater block, so that when the temperature is increased, the elongated rod increases in temperature and expands. A lower end of the heated rod will then be forcibly displaced in an axial direction, to press upon flexible lip and bend downwardly slightly to narrow the gap between the lips and decrease the thickness of the sheet which is being extruded.

U.S. Pat. No. 4,279,857 discloses a shaping nozzle having a core member surrounded by a two part sleeve to define an annular passageway which terminates in an exit passage around an outwardly and downwardly flared central pin or mandrel. An outer fixed ring surrounds an inner, elastic ring which has a substantially crescent shaped interior. A wedge engages an element and an outer ring, and movement of the wedge can determine the shape of the passageway at a given axial position. An axially displaceable piston defines the size of the passageway. An elastic ring having a cylindrical inner surface defines a part of flow passageway. Also, axial displacement of a piston causes movement of a frustoconical surface that defines a wall of the passageway and is capable of changing the thickness and shape of the passageway adjacent the nozzle.

U.S. Pat. No. 4,432,718 discloses an extrusion head comprising a die core and a casing ring located within a head housing. Each die ring section is axially adjustable by positioning screws so that the lower edge boundary of the die gap will be changed. In this fashion the extruded tube material will have walls of variable thickness at predetermined points and the thickness of the extruded tube will increase or decrease as a result of changes in the outer circumference of the tube while its interior contour remains the same.

Although certain of the prior art patents discussed above disclose an axially movable mandrel which is capable of either completely stopping or modulating the flow of material through an extrusion orifice, none of these patents disclose the specific configuration of applicant's apparatus as set forth below. In particular, the prior art does not disclose a relatively stationary cylindrical sleeve and a piston movable within the sleeve which has a rearwardly directed edge for modulating and/or cutting off the flow of extrudate, in combination with means for compensating for the pressure changes within the extrudate adjacent the orifice for applying the inner layer, to enable a precise cutoff and start of the inner layer as in our invention.

U.S. Pat. No. 4,776,909 which is assigned to the same assignee as the present application, discloses broadly a method for varying the thickness of an extrudate by varying the inner surface thereof by adjusting an extrusion die opening in a controlled manner so as to vary the feed rate of rubber to the extrusion orifice. However, no apparatus is shown or described in this earlier patent which compensates for the pressure exiting within the extrudate upon the stopping and starting of the flow of the extrudate when forming the inner layer to provide an accurate termination and start of the inner layer as in our invention.

SUMMARY OF THE INVENTION

An objective of the invention is providing a solution to the noted prior art problem in terms of apparatus by producing a generally tubular elastomeric ply in which the inner surface or profile thereof can be varied, especially for use in a first stage tire.

A further objective is to provide a coextrusion apparatus in which the interior profile of the extrudate, composite or body can be applied substantially simultaneously with the formation of the tubular body; in which the inner liner material or profile can be abruptly initiated, profiled and terminated with no smearing or contamination of the inner surface of the tubular extrudate on which the inner liner is applied, whereby the tubular composite can be cut at a desired location enabling the turnup or turndown of the ply around a tire bead and bead filler. This can be accomplished without harmful effects from contamination.

A further objective is to provide such a coextrusion apparatus in which a shear termination can be made for the flow stream of the inner liner elastomeric material which is applied to the inner surface of the tubular extrudate, together with volumetric compensation for the flow channel through which the inner liner material is moving, by hydraulic actuation in opposition to the movement of the termination mechanism.

Still another objective of the invention is to provide such a coextrusion apparatus in which filament-type or cord reinforcing elements can be introduced into the tubular extrudate generally simultaneously with the formation of the tubular extrudate, and generally simultaneously with the applying of the profiled interior surface on the tubular extrudate.

A further objective of the invention is to provide such a coextrusion apparatus which will prepare a precise, accurate, multi component composite tubular member intended primarily for formation of a pneumatic tire, having a profiled interior surface whereby the interior surface can be profiled with different materials which can be abruptly initiated and terminated without drool, weeping or smearing of the inner material and without contamination of the thin-coated inner surface of the tubular extrudate.

A still further objective is to provide such an improved coextrusion apparatus in which the inner liner preferably has a ramped beginning and end configuration providing a smooth merger with the inner surface of the reinforced tubular extrudate; and in which this smooth merger is accomplished by use of a compensator ring which adjusts the volume of the flow channel adjacent the cutoff or shear termination point to reduce undesired volumetric variations and pressure variations within the inner material flow channel at the discharge orifice where it is applied to the inner surface of the tubular extrudate.

Still a further objective of the invention is to provide such an improved coextrusion apparatus in which the application of the inner or lumen coating material is controlled principally by a inner die member and a compensating ring which are coaxially slidable with respect to each other, each of which is movable by a hydraulically actuated piston rod, one of which is slideably located within the other piston rod, to provide a compact, yet highly efficient piece of equipment, whereby the movement of the actuating rods and corresponding die ring and compensating ring can be accurately controlled by programmable equipment or the like.

A further objective is to provide such an improved coextrusion apparatus which is of a relatively rugged and durable construction, which can be easily disassembled for repair and maintenance, and which can be used with commercially available extruders for receiving the supply of extrudate material; and in which the type of reinforcing elements incorporated therein can vary depending upon the particular final tire product desired.

Another objective of the invention is to provide such an improved coextrusion apparatus in which the pressure compensating ring and inner extrusion die ring are each formed as a one piece integral component, each including a piston portion thereof which axially move the rings concentrically with respect to each other, in which the pistons are located within annular fluid chambers having multiple fluid supply lines for delivering actuating fluid on either side of the pistons for movement thereof.

Another objective is to provide such an improved coextrusion apparatus in which a third stream of an elastomeric material is applied to the outer surface of the tubular extrudate for applying a different coating of an elastomeric material thereon, preferably in the construction of a pneumatic tire.

These objectives and advantages are obtained by the apparatus of the invention, the general nature of which may be stated as a coextrusion apparatus for varying the inner profile of a generally tubular extrudate, including an outer die assembly forming an outer extrusion orifice for forming the tubular extrudate, and an inner die assembly forming an adjustable inner extrusion orifice for depositing elastomeric material on an inner surface of the tubular extrudate for varying the inner profile of said extrudate; first means for forming an outer flow channel for delivering a first stream of an elastomeric material to the outer extrusion orifice of the outer die assembly to form the tubular extrudate; second means for forming an inner flow channel for delivering a second stream of an elastomeric material to the inner extrusion orifice of the inner die assembly, said inner die assembly having a fluid pressure actuated axially movable annular compensating ring located concentrically within a fluid pressure actuated axially movable annular die ring for controlling the pressure within the second stream of elastomeric material as it moves through said inner extrusion orifice for depositing same on the inner surface of the tubular extrudate.

BRIEF DESCRIPTION OF THE DRAWINGS

Preferred embodiments of the invention, illustrative of the best modes in which applicants have contemplated applying the principles, are set forth in the following description and are shown in the accompanying drawings and are particularly and distinctly pointed out and set forth in the appended claims.

Similar numerals refer to similar parts throughout the drawings.

DESCRIPTION OF THE PREFERRED EMBODIMENT

Figure 1:
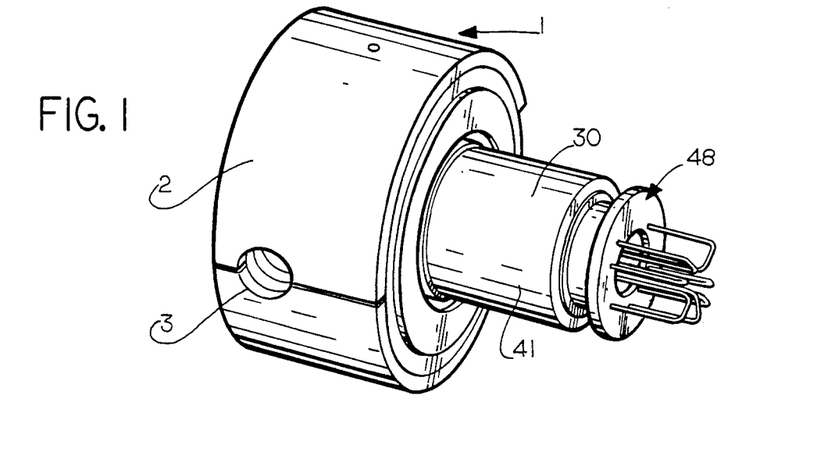
FIG. 1 is a perspective view of the front portion of the coextrusion apparatus of the present invention.
Figure 2:
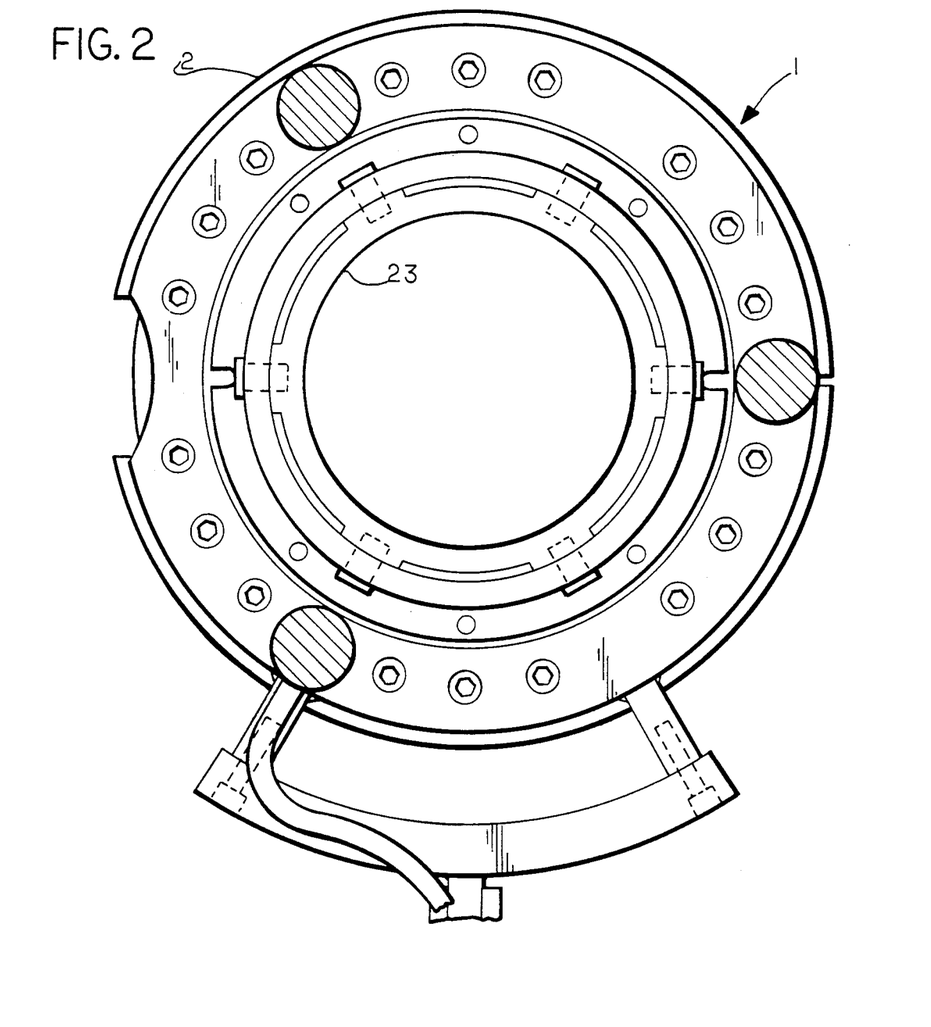
FIG. 2 is an enlarged elevational view of the entrance end of the coextrusion apparatus of FIG. 1, with portions in section.
Figure 3:
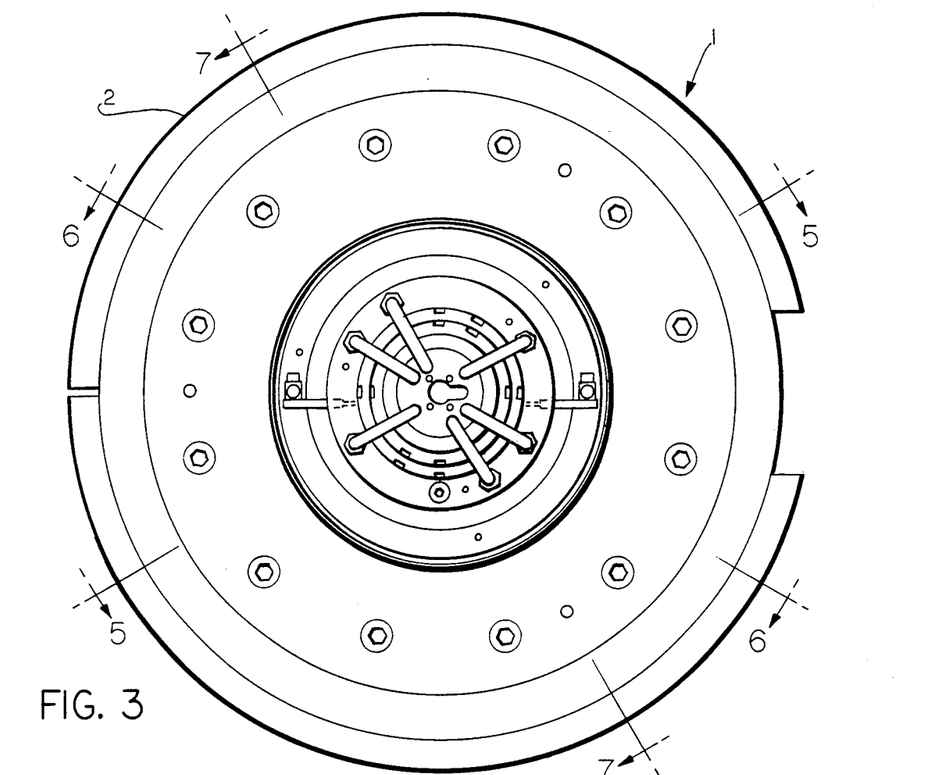
FIG. 3 is an enlarged elevational view of the exit end of the coextrusion apparatus of FIG. 1.
Figure 4:
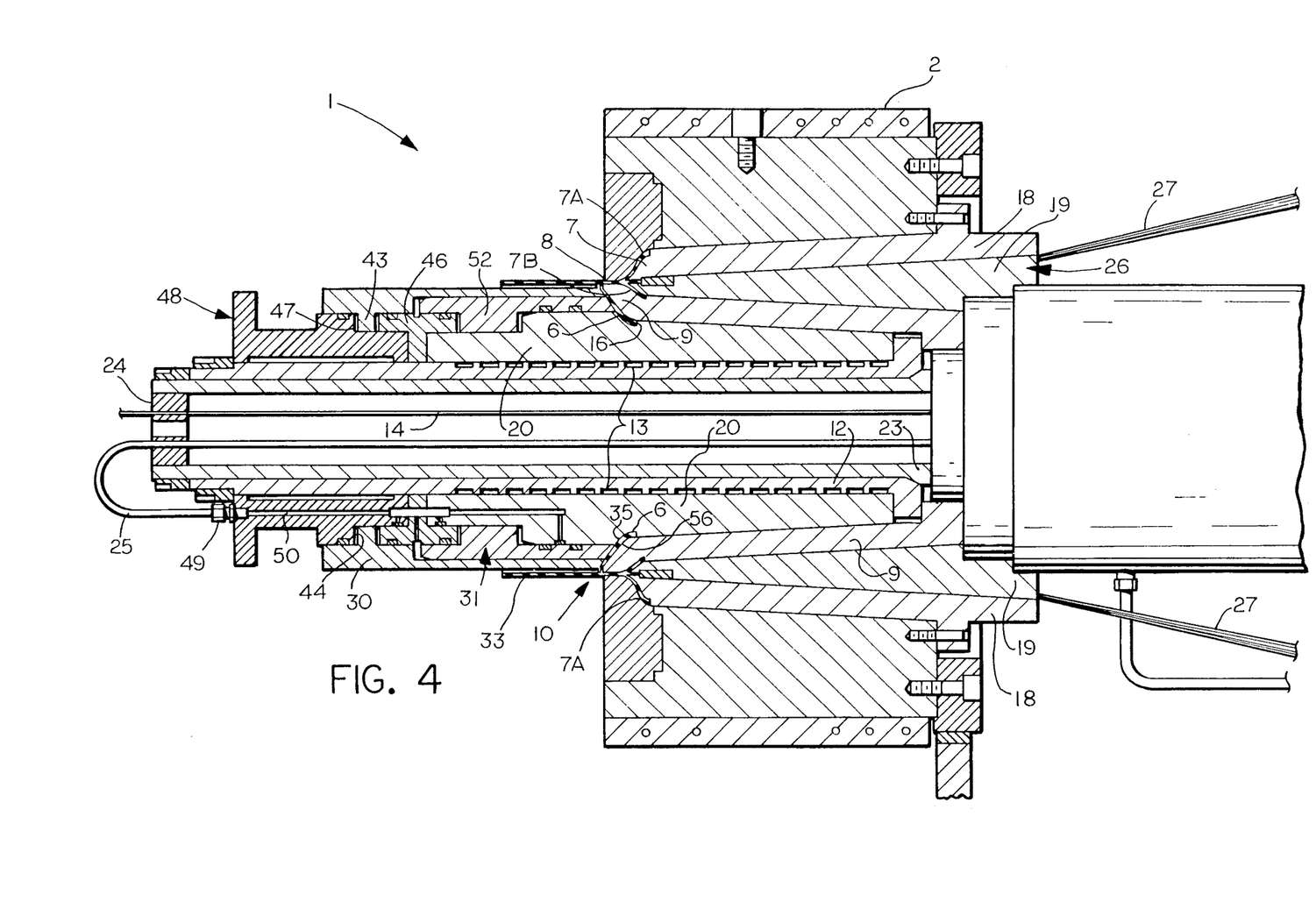
FIG. 4 is a vertical longitudinal sectional view of the extrusion apparatus of FIG. 1.

Referring to the drawings and specifically to FIGS. 1, 2 and 3, there is illustrated a perspective and end views of a coextrusion head, indicated generally at 1. Coextrusion head 1 includes an outer shell or housing 2 formed with a pair of inlet feed apertures 3, only one of which is shown, which are adapted to be threadably connected to delivery conduits through which separate streams of elastomeric stock flow from one or more externally located extruders. The elastomeric material flows into individual separate material flow channels which are formed within the extrusion head for subsequent delivery to the extrusion orifices as described below. The apparatus and means of delivery of the separate streams of elastomeric material within the coextrusion head are similar in many respects to that shown in U.S. Pat. Nos. 4,578,024 and 4,657,718 incorporated herein by reference. Each of the inlet apertures communicates with a respective one of the flow channels for supplying a stream of an elastomeric material to a respective extrusion orifice of a die assembly.

Figure 7:
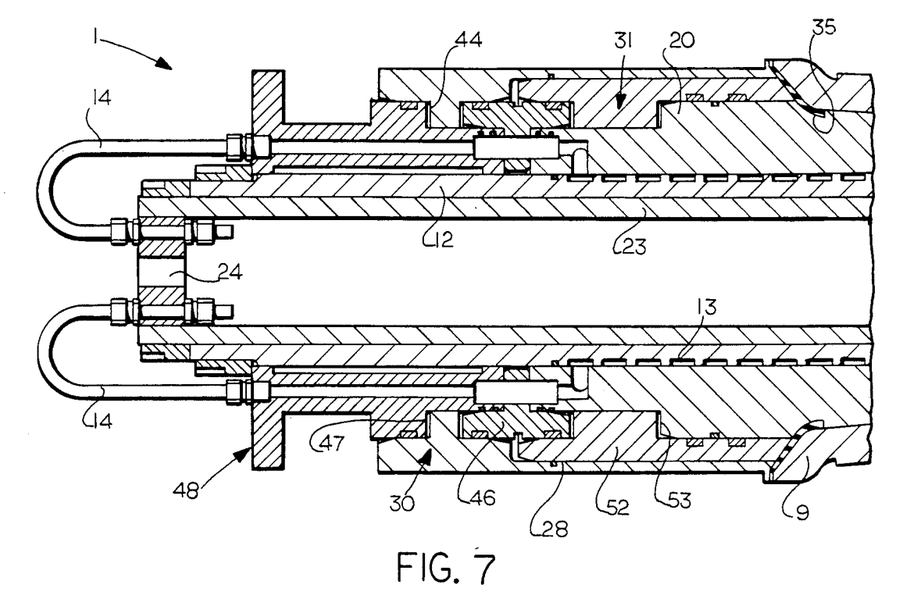
FIG. 7 is a reduced fragmentary sectional view taken on line 7—7, FIG. 3.

An outer stream 7 of an elastomeric material flows through an outer flow channel (not shown) which is formed within shell 2 where it is split into two separate flow streams 7A and 7B in a manner similar to that shown in the two patents set forth above, for subsequent merging and coating of reinforcing elements 27 before passing through an annular outer orifice 8 (FIGS. 4 and 10-15) formed between a generally fixed outer die ring 11 and an inner annular anvil ring 9 which form an outer die assembly indicated generally at 5. Ring 9 also is a component of an inner die assembly which is indicated generally at 10 (FIGS. 4-8), and which is described in greater detail hereinafter. Temperature fluid control channels 13 are formed in a cylindrical sleeve 12 of shell 2 in order to permit heating and cooling of the interior thereof, and in particular, to maintain the die assemblies at the desired operating temperatures. These channels are connected to a source of heating and cooling fluid by conduits 14 (FIG. 7).

A pair of annular shaped members 18 and 19 are mounted within outer shell 2 and form in cooperation with outer shell 2, the outer flow channel. Another annular member 20 in cooperation with anvil ring 9 form an innermost flow channel 16 (FIG. 4) through which moves an inner stream 6 of elastomeric material. A cylindrical axially extending tube 23 extends generally throughout the length of apparatus 1 and is provided with a plurality of spaced support discs 24 on which is mounted an air floatation tube (not shown) and a plurality of hydraulic fluid supply lines, collectively indicated at 25 and temperature fluid control conduits 14. A guide assembly 26 similar to the guide assembly of previously noted U.S. Pat. Nos. 4,578,024 and 4,657,178 is used for independently directing and accurately positioning a circular array of uniformly spaced individual reinforcing elements 27 which are located within and extend through individual guide tubes (not shown). Reinforcing elements 27 generally take the form of filaments, threads, yarns or cords and include natural or synthetic textiles, steel, wire, fiberglass, etc. and are encapsulated within the streams 7A and 7B of elastomeric material and merge therewith at the outer extrusion orifice 8 as disclosed in the two noted patents.

The general construction of coextrusion head 1 including shell 2 and annular inner members 18-20 and the outer die assembly and reinforcing guide assembly, are well known in the art and form no particular part per se, of the present invention, but are components within which the improvements of the invention are incorporated to form the improved coextrusion apparatus.

In accordance with the invention, inner die assembly 10 includes an inner die ring 30 shown particularly in FIGS. 4-7 and 9-16, which in cooperation with a compensating ring 31 enables the inner profile of a tubular extrudate 33 (FIG. 8) to be accurately varied and modified depending upon the particular manufacturing operation being performed. Inner die ring 30, compensating ring 31 and annular member 20, in cooperation with inner anvil ring 9 form inner die assembly 10 and form an inner extrusion orifice 35. Inner die ring 30 (FIGS. 10-15) terminates in a pair of stepped outer annular surfaces 37 and 38 and a conical inner surface 39. Inner surface 39 forms inner extrusion orifice 35 in cooperation with the generally conically extending annular end surface 40 of anvil ring 9. Inner orifice 35 communicates with annular inner flow channel 16 for receiving a supply of elastomeric material from stream 6 for depositing on an inner surface 57 of tubular extrudate 33. Compensating ring 31 is slidably located about annular member 20 and is axially slidably mounted within inner surface 28 of die ring 30.

The diameter of annular surface 37 of die ring 30 is less than the diameter of anvil ring 9 so that a space is provided as indicated at 34 (FIG. 10), to prevent the metal surface of ring 30 which is contacted by elastomeric stream 6 from contacting the inner surface of tubular extrudate 33 to prevent contamination thereof.

In accordance with one of the features of the invention, inner die ring 30 is formed with an integral annular piston 43 (FIGS. 4–7, 9 and 16) which extends radially inwardly and is slidably mounted within an annular fluid pressure chamber 44. Pressure chamber 44 is formed between a stationary sealing ring indicated generally at 6, and a stepped shoulder 47 of a cylindrical end closure plate indicated generally at 48. Hydraulic fluid supply lines 25A and 25B (FIGS. 5 and 6) extend through the interior of cylindrical tube 23 and are connected by connectors 49 to flow channels 50 formed within end closure plate 48.

Figure 5:
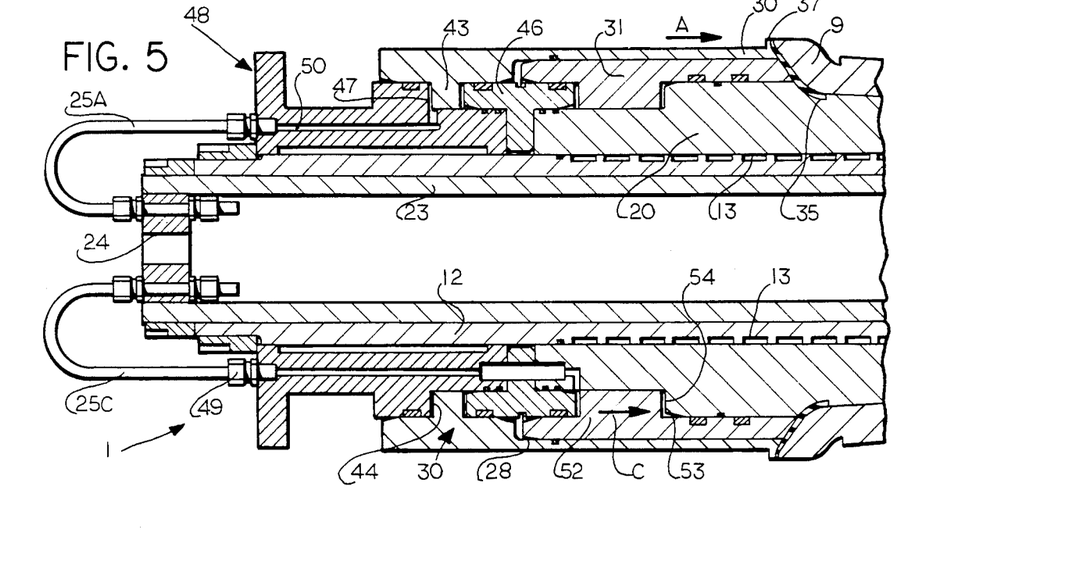
FIG. 5 is a reduced fragmentary sectional view 10 taken on line 5—5, FIG. 3.
Figure 6:
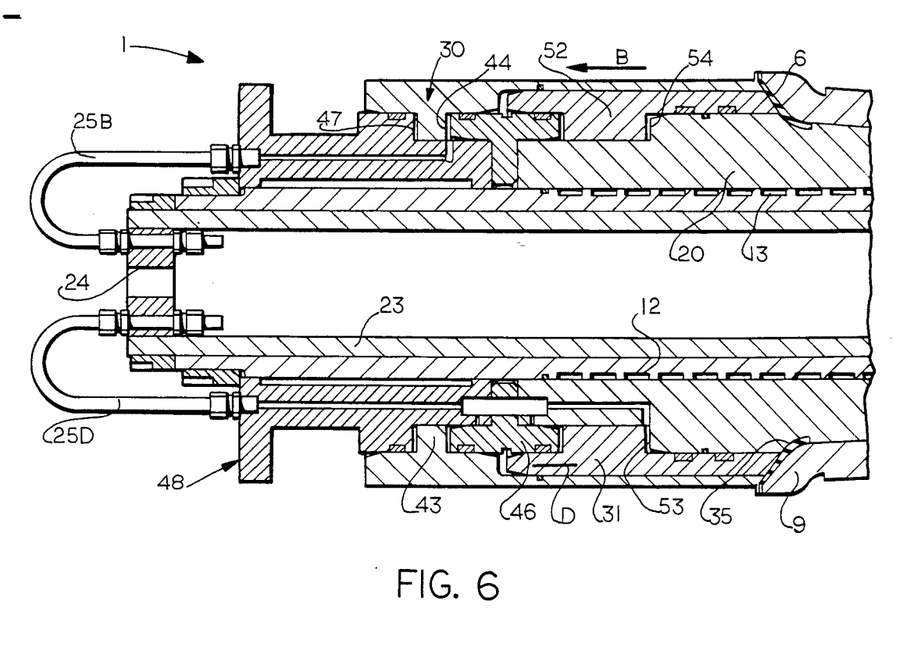
FIG. 6 is a reduced fragmentary sectional view taken on line 6—6, FIG. 3.

As shown in FIG. 5, hydraulic fluid line 25A will supply hydraulic fluid to chamber 44 on the left side of piston 43 for moving inner die ring 30 in the direction of arrow A for reducing the size of inner extrusion orifice 35. Hydraulic fluid line 25B (FIG. 6) supplies fluid to fluid chamber 44 on the right side of piston 43 (FIG. 6) to move die ring 30 in the direction of arrow B for increasing the size of inner extrusion orifice 35.

In further accordance with the invention, compensating ring 31 includes an annular radially inwardly extending piston 52 preferably formed integrally on compensator ring 31, which extends into an annular fluid pressure chamber 53 formed between stationary seal ring 46 and a step shoulder 54 of annular member 20. As shown in FIG. 5, a hydraulic fluid supply line 25C communicates with fluid pressure chamber 53 on the left side of compensating ring piston 52 for moving ring 31 in the direction of arrow C. A hydraulic fluid supply line 25D (FIG. 6) communicates with fluid pressure chamber 53 on the right side of piston 52 for moving compensating ring 31 in the direction of arrow D.

Figures 8, 9:
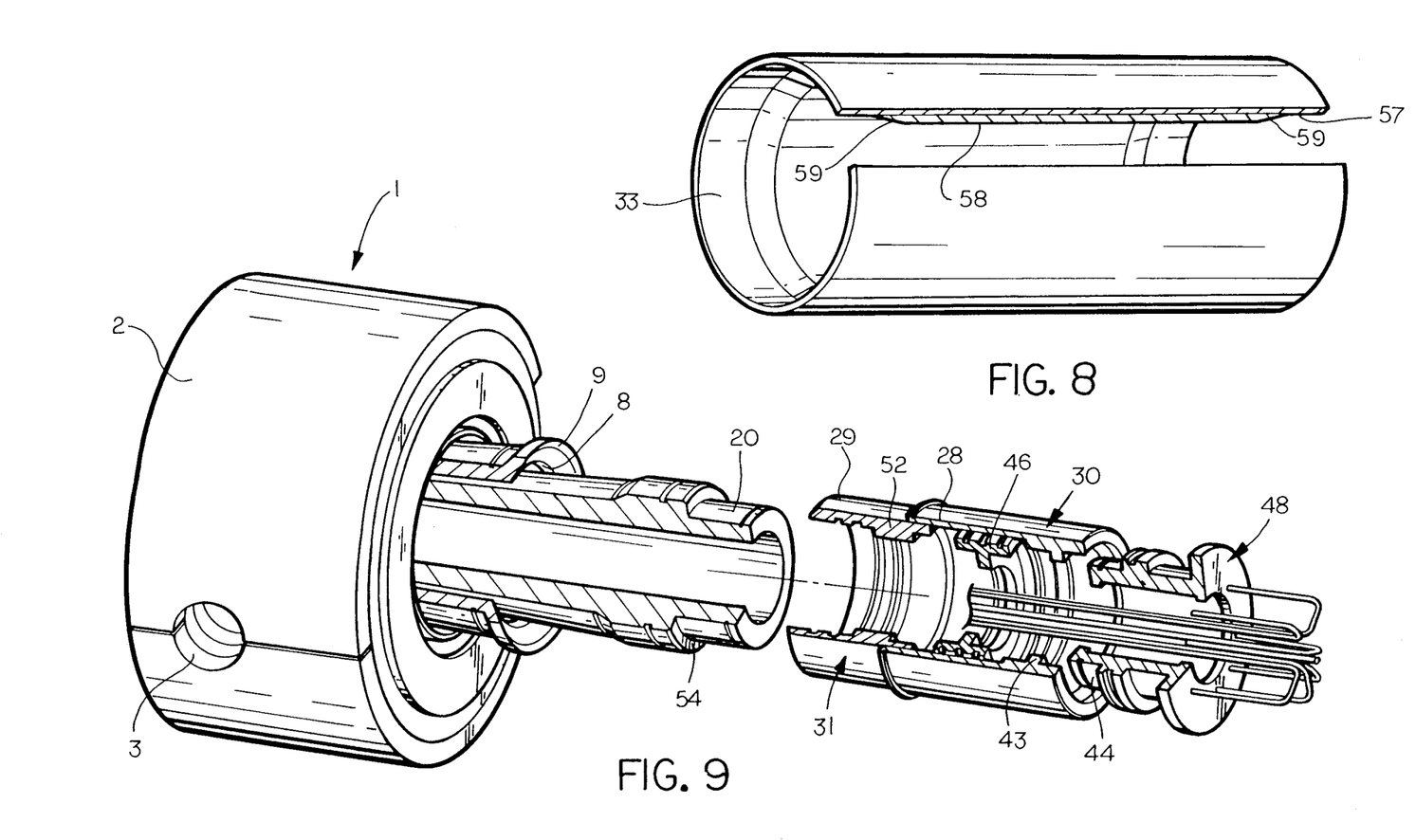
FIG. 8 is a perspective view of a tubular extrudate with portions broken away, showing the varied inner profile accomplished by the apparatus of the invention.
FIG. 9 is an exploded perspective view with portions broken away of the coextrusion apparatus as shown in FIG. 1.
Figure 14:
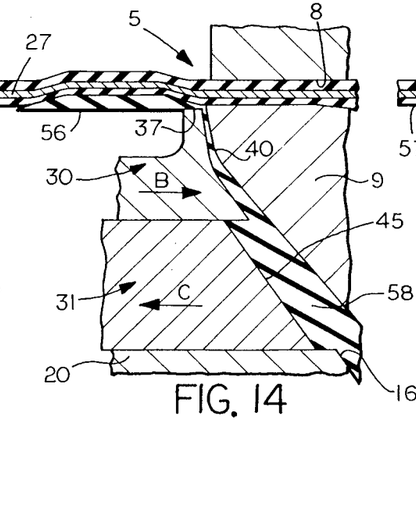
Figure 15:
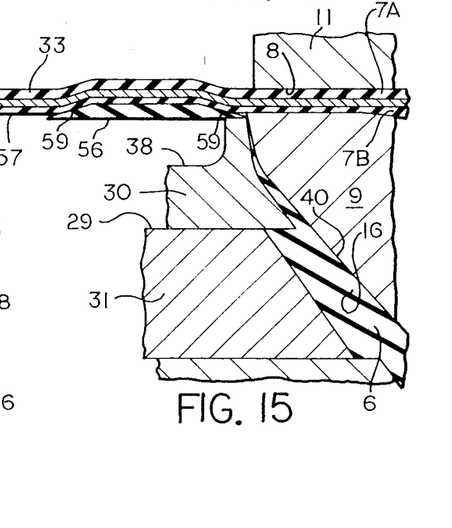
Figure 16:
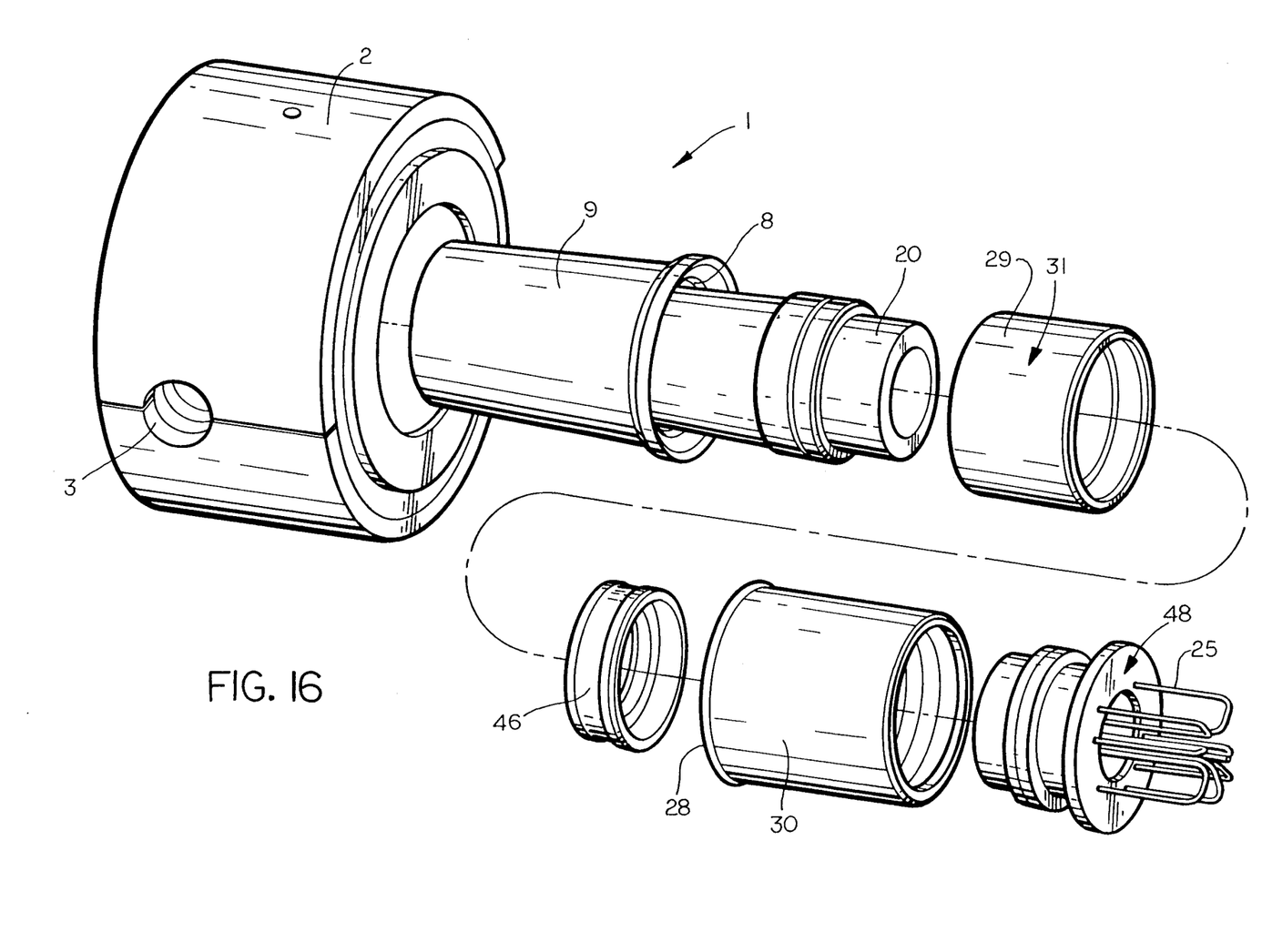
FIG. 16 is an exploded perspective view of the extrusion apparatus in elevation.

Inner die ring 30 and annular piston 43 preferably form an integral one-piece member having a generally cylindrical configuration with an inner cylindrical surface 28 (FIGS. 9 and 16). Compensating ring 31 and piston 52 preferably form a similar one-piece integral member having a generally cylindrical configuration with an outer cylindrical surface 29 which is coaxially slidably engaged with inner surface 28 of inner die ring 30 (FIGS. 10–15).

Figure 10:
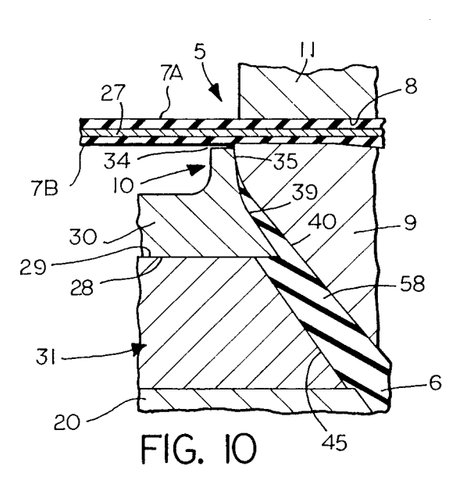
FIGS. 10-15 are enlarged fragmentary diagrammatic sectional views showing the operational sequence of forming the inner material profile on the interior wall of the tubular extrudate.

The operation of the improved coextrusion apparatus is best illustrated by reference to FIGS. 10–15. Inner and outer streams of rubber composition 6 and 7 respectively, are fed into coextrusion head from extrusion apparatus well known in the art and move through their respective flow channels towards their respective extrusion orifices 35 and 8, respectively. Outer elastomeric streams 7A and 7B flow through outer extrusion orifice 8 as shown in FIG. 10 in a generally uniform manner preferably containing reinforcing elements 27 embedded therein. Computer control preferably is utilized to control the flow rate and pressure of streams 6 and 7 of elastomeric material as they leave the external extruders and enter apparatus 1, as well as controlling the tension of incoming reinforcing elements 27.

Likewise, upon opening and closing of inner extrusion orifice 35 as described below, the flow rate or pressure of elastomeric stream 6 will be correspondingly increased by the control computer as the inner die opens and decreased as the die closes to provide a uniform flow and pressure of elastomeric material through orifice 35. Thus, the thickness of the applied inner extrudate layer 56 is determined in part by the flow rate or pressure imparted on incoming stream 6 in relationship to the flow rate of stream 7 of the associated connected extruder.

Inner die ring 30 is shown in FIG. 10 in closed position completely closing inner orifice 35 by an inner portion of conical surface 39 pinching against the annular generally conical end surface 40 of anvil ring 9. In order to apply an inner layer of an elastomeric material on an inner surface 57 of tubular extrudate 33 which is formed by outer extrusion orifice 8, a program controlled mechanism of a type well known in the art, is actuated and supplies hydraulic fluid into fluid chamber 44 through conduit 25B (FIG. 6) which will move piston 43 and consequently inner die ring 30 upstream or in the direction of arrow B, to open orifice 35. This permits the flow of elastomeric material from inner stream 6 to move through orifice 35 and onto inner surface 57 of tubular extrudate 33.

In accordance with the invention, compensating ring 31 will move axially inwardly or upstream in the direction of arrow C (FIGS. 5 and by supplying hydraulic fluid through line 25C into chamber 53. The movement of compensating ring 31 is in a predetermined relationship with the outward movement of die ring 30 to reduce the volumetric area at the entrance to inner extrusion orifice 35 to maintain or achieve the required or desired pressure within the elastomeric material of inner stream 6 adjacent inner extrusion orifice 35. This action of the compensating ring 31 within the elastomeric stream provides for a smooth even discharge flow rate of elastomeric material through inner orifice 35 and onto inner surface 57 of extrudate 33. This action is also described in the previously referenced copending application entitled "Coextrusion Apparatus and Method for Varying the Inner Profile of a Tubular Extrudate", being filed concurrently herewith.

Figure 11:
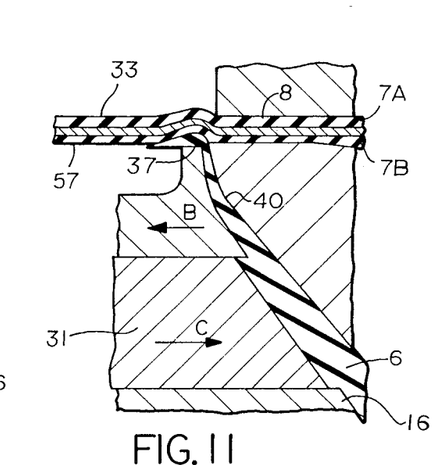
Figure 12:
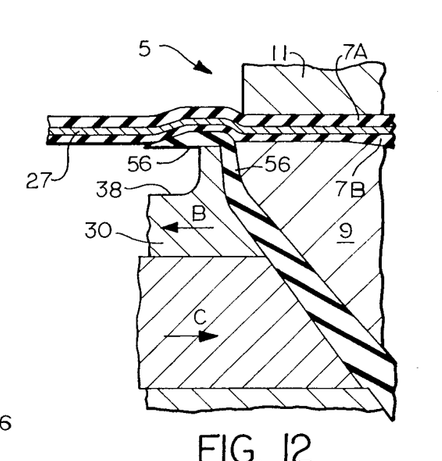
Figure 13:
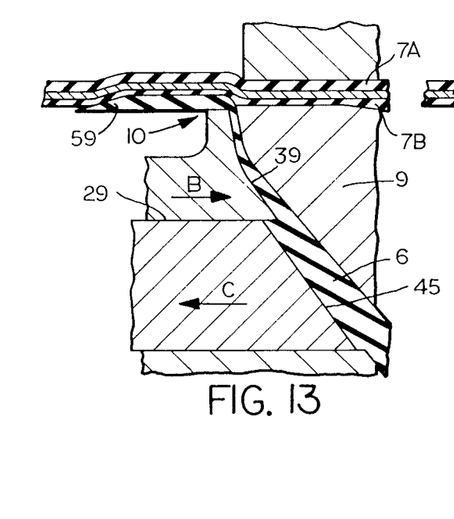

Upon achieving the desired axial length of inner extrudate layer 56 on inner surface 57 as shown in FIGS. 11 and 12, the appropriate controls are actuated whereby hydraulic fluid is introduced into the left side of fluid chamber 43 (FIG. 5) through conduit 25A to move die ring 30 in the upstream direction of arrow A, to begin to close orifice 35 simultaneously with the opposite directional movement of compensating ring 31 in the direction of arrow B (FIG. 6) by the introducing of hydraulic fluid into the right side of chamber 53 through conduit 25D. This coordinated movement provides for the formation of an expansion chamber area indicated at 58 (FIG. 14), between a conical inner end face 45 of compensating ring 31 and conical surface 40 of anvil ring 9. This reduces the pressure within the elastomeric material adjacent compensating ring 31 which prevents the internal pressure from excessively forcing the remaining amount of elastomeric material out through the closing of inner orifice 35, which would result in an uneven termination point of inner layer 56. This enables a smooth, complete and absolute termination point for the inner layer. Without such compensating action, this smooth transition would be extremely difficult to obtain.

The compensation of the pressure/volume at the time of initiation of the opening of inner orifice 35 and the subsequent flow of elastomeric material therethrough continuing through the termination of the inner flow upon closing of the inner die ring 30, ensures a clean, smooth initiation and cut-off of the inner layer flow material providing a pair of ramped end surfaces 59 at the beginning and end of inner layer 56. Without the formation of the expansion chamber and the simultaneous compensation for the change in pressure/volume which would occur within the elastomeric material adjacent the inner extrusion orifice, due to the opening and closing thereof, the termination and beginning of inner layer 56 would be uneven and undesirable. During the termination of the inner elastomeric stream upon closing of inner orifice 49 as shown in FIGS. 14–15, the terminating portion of the strip of material is placed in shear which provides for the smooth ramped termination at the axial end of layer 56.

In most applications, inner elastomeric stream 6 will be of a different rubber composition than that of outer stream 7, and the compositions of either stream can be varied to achieve various results desired in the making of pneumatic tires or other tubular articles. Also streams 7A and 7B each can be supplied by a separate, externally located extruder, if desired.

Encoders (not shown) will be connected to compensating ring 31 and die ring 30 and the fluid supply lines associated therewith, for controlling the movement of the pistons and are operatively connected by appropriate control circuitry well known in the art to a programmable computer. Such controlled movement enables the accurate control of the inner die ring and compensating ring for achieving the correct initiation and termination of inner elastomeric layer 56 in coordinated movement with the production of the outer tubular extrudate 33.

Figure 17:
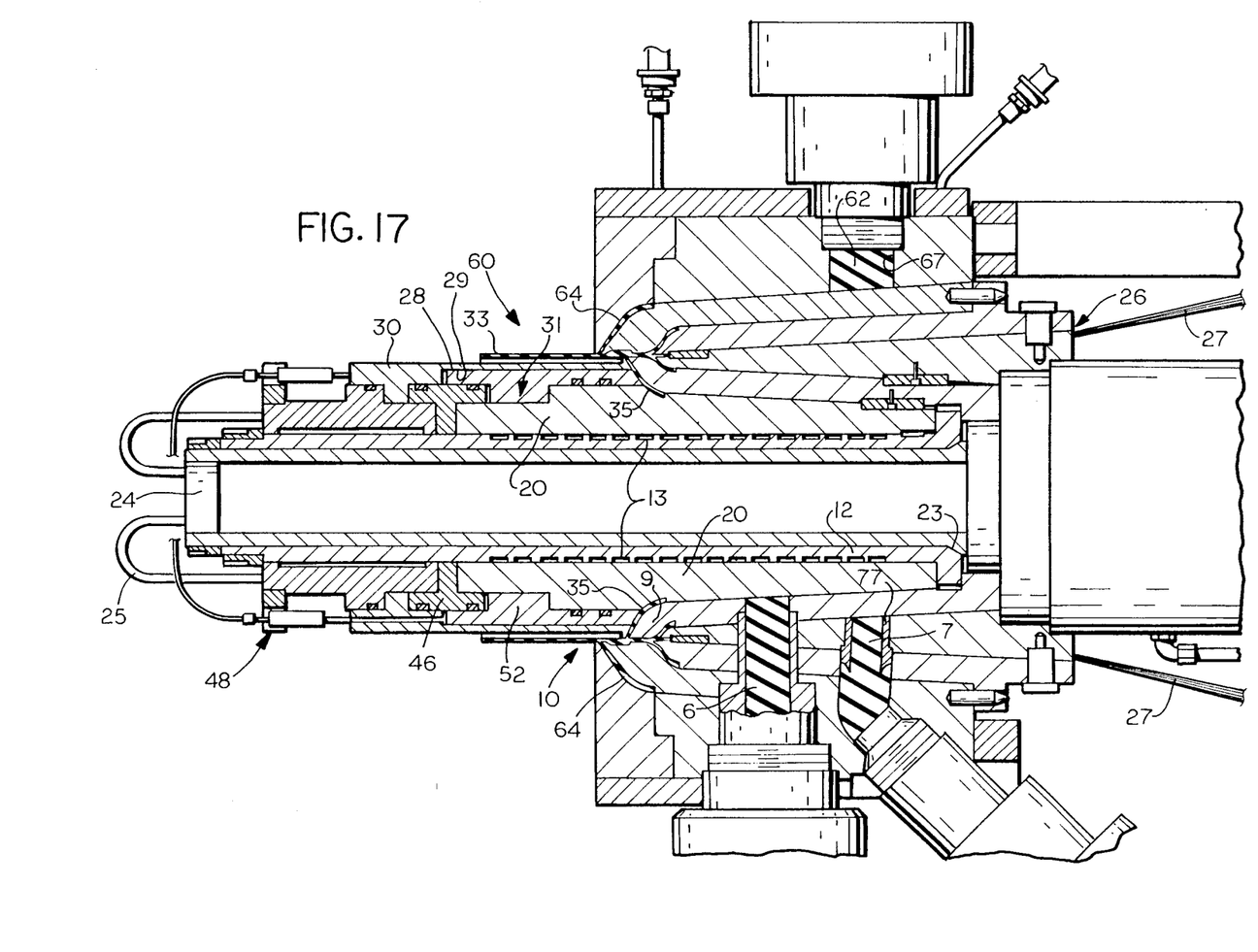
FIG. 17 is a longitudinal sectional view similar to FIG. 4 showing a modified form of the improved coextrusion apparatus.
Figure 18:
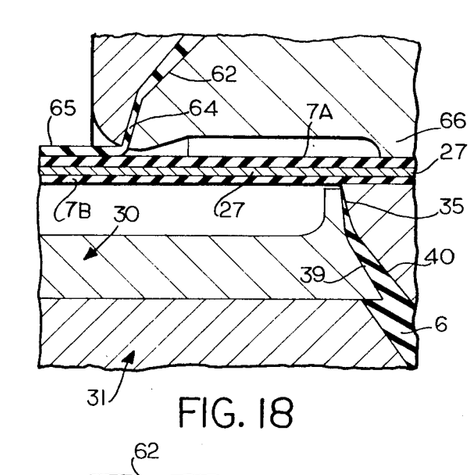
FIGS. 18-23 are enlarged fragmentary diagrammatic sectional views showing the operational sequence of depositing another layer of an elastomeric material on the outer surface of the tubular extrudate formed by the apparatus of FIG. 17.
Figures 19, 22:
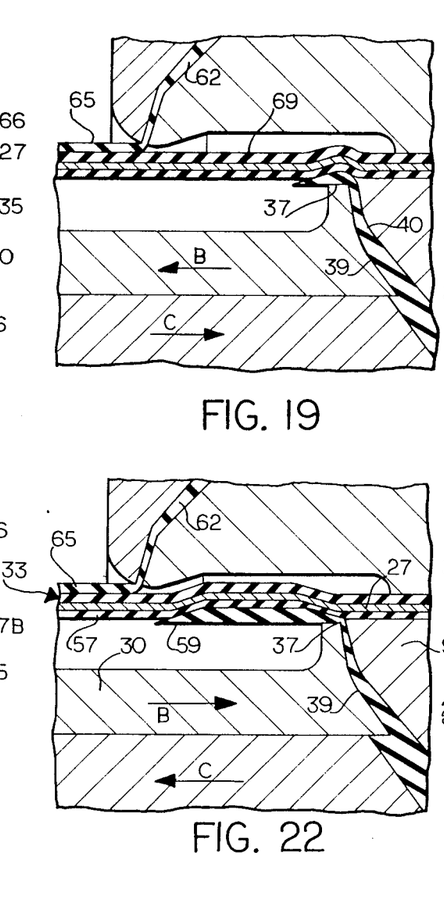
Figures 20, 23:
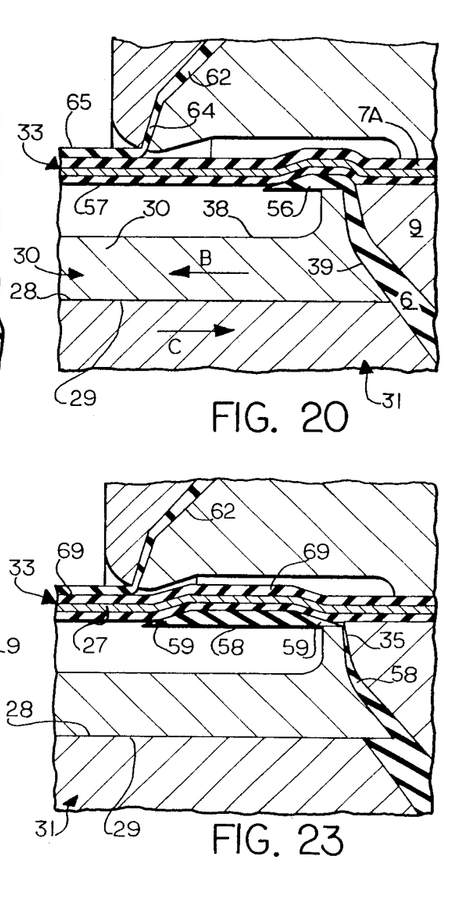
Figure 21:
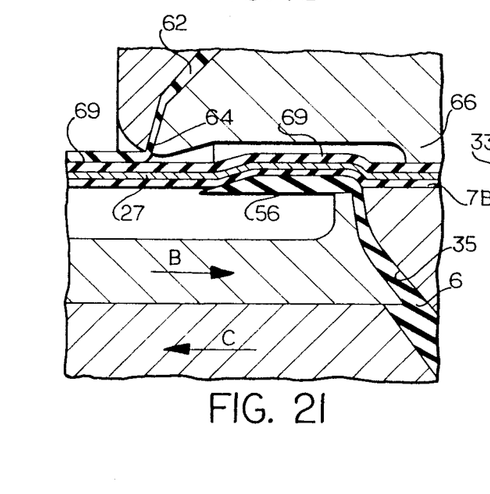

A modification form of the improved apparatus is indicated generally at 60 and is shown in sectional view in FIG. 17. The construction and operation of modified apparatus 60 is similar to that of apparatus 1 described above, in that it has an incoming stream 7 of elastomeric material which is split into streams 7A and 7B to coat reinforcing elements 27 to form the generally tubular extrudate 33 and has an inner stream 6 of elastomeric material which is used to vary the inner profile as described above. In addition, a third stream 62 of elastomeric material is fed from a nozzle 63 connected to a usual extruder and flows through a third flow channel 67 and subsequently through a generally fixed orifice 64 for applying a generally constant outer layer 65 on tubular extrudate 33. Incoming stream 7 will flow through a flow diverter 77 so as to split into streams 7A and 7B to subsequently merge to uniformly coat reinforcing elements 27 as shown in FIGS. 18–23 and described previously above. Inner stream 6 is then applied onto the inner surface 57 of tubular extrudate 33 as described above by axially moving inner die ring 30 and compensating ring 31. In accordance with the feature of modified apparatus 60, the third elastomeric stream 62 moves through fixed extrusion orifice 64 to deposit an outer layer 65 of an elastomeric material on the outer surface 69 of tubular extrudate 33. The thickness of layer 65 is regulated preferably by controlling the pressure and flow rate of incoming stream 62 from nozzle 63 of the exterior extruder. The operational sequence of modified apparatus 62 is shown particularly in FIGS. 18 and 23 and is similar to that described above with respect to FIGS. 10–15, wherein the flow rate of inner stream 6 is regulated by die ring 30 and compensating ring 31 for applying the inner extrudate layer 56 on extrudate 33, generally simultaneously with the application of generally fixed outer layer 65 thereon.

Accordingly, the improved apparatus provides for the accurately controlled application of an inner layer of elastomeric material onto the inner surface of a continuously produced tubular extrudate to provide a smooth preferably ramped, initiation and cut-off of the inner layer with the extrudate by compensating for the pressure changes at the inner extrusion orifice by an axially movable compensating ring which moves in coordinated movement with a variable axially movable inner die ring, which enables the thickness of the inner layer to be regulated easily by adjusting the size of the inner extrusion orifice. Furthermore, in a modified embodiment of the apparatus, a generally constant outer layer can be applied simultaneously with the application of the variable inner layer onto the outer surface of the tubular extrudate.

Accordingly, the coextrusion apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved coextrusion apparatus is constructed and used, the characteristics of the construction, and the advantageous, new and useful results obtained; the new and useful structures, devices, elements, arrangements, parts and combinations, are set forth in the appended claims.

We claim:

1. Coextrusion apparatus for varying the inner profile of a generally tubular extrudate, including an outer die assembly forming an outer extrusion orifice for forming the tubular extrudate, and an inner die assembly forming an adjustable inner extrusion orifice for depositing elastomeric material on an inner surface of the tubular extrudate for varying the inner profile of said extrudate; first means for forming an outer flow channel for delivering a first stream of an elastomeric material to the outer extrusion orifice of the outer die assembly to form the tubular extrudate; second means for forming an inner flow channel for delivering a second stream of an elastomeric material to the inner extrusion orifice of the inner die assembly; said inner die assembly having an axially movable annular compensating ring located concentrically within an axially movable annular die ring both of which extend in a downstream direction from the inner extrusion orifice; annular pistons cooperating with each of the die ring and compensating ring and spaced axially from each other downstream of the inner extrusion orifice, each of said pistons being axially movable within an annular fluid chamber; and fluid supply means communicating with each of the fluid chambers for reciprocally moving said pistons independently of each other for moving the die ring to vary the size of the inner extrusion orifice and for moving the compensating ring to vary the size of an expansion chamber in relationship to the size of the inner extrusion orifice, for controlling the pressure within the second stream of elastomeric material as it moves through said inner extrusion orifice for depositing on the inner surface of the tubular extrudate.

2. The coextrusion apparatus defined in claim 1 in which the compensating ring includes an outer cylindrical surface which is slidably engaged with an inner cylindrical surface of the die ring.

3. The coextrusion apparatus defined in claim 1 in which the compensating ring terminates in a generally conical inner end face which forms the expansion chamber in communication with the inner flow channel.

4. The coextrusion apparatus defined in claim 3 in which the fluid supply means is a plurality of fluid supply lines; and in which the fluid supply lines communicate with the fluid chambers on opposite sides of the pistons for positively reciprocally moving said pistons in opposite directions within their respective chambers for moving the compensating ring to vary the size of the expansion chamber and for moving the die ring to vary the size of the inner extrusion orifice.

5. The coextrusion apparatus defined in claim 1 in which the compensating ring and its piston form an integral one-piece member.

6. The coextrusion apparatus defined in claim 1 in which the die ring terminates in a conical end surface which partially forms the inner extrusion orifice; and in which the die ring end surface moves axially concentrically with respect to an inner end face of the compensating ring.

7. The coextrusion apparatus defined in claim 1 in which the die ring and its piston form an integral one-piece member.

8. The coextrusion apparatus defined in claim 1 in which a reinforcing guide assembly is mounted within the outer flow channel for directing a plurality of individual reinforcing elements into the outer flow channel for introduction into the first stream of elastomeric material.

9. The coextrusion apparatus defined in claim 8 in which the outer flow channel includes a flow splitter for dividing the first stream of elastomeric material into two separate streams for depositing on opposite sides of the reinforcing elements.

10. The coextrusion apparatus defined in claim 1 including a third flow channel for delivering a third stream of an elastomeric material for depositing on an outer surface of the tubular extrudate.

11. The coextrusion apparatus defined in claim 1 in which the outer die assembly includes an inner anvil ring located axially upstream of the die ring having an outer annular surface of a greater diameter than the diameter of an outer annular surface of the die ring to prevent contact of said die ring outer annular surface with the first stream of elastomeric material and possible contamination thereof.

* * * * *